United States Patent
Gihm et al.

(10) Patent No.: US 11,453,591 B2
(45) Date of Patent: Sep. 27, 2022

(54) PROCESS FOR PREPARING A CARBON NANOTUBE SHEET COMPRISING A UNIAXIALLY ALIGNED YARN AND CARBON NANOTUBE SHEET PREPARED THEREBY

(71) Applicant: AweXome Ray, Inc., Anyang-si (KR)

(72) Inventors: Se Hoon Gihm, Seongnam-Si (KR); Keun Soo Jeong, Seoul (KR); Yeon Su Jung, Seoul (KR)

(73) Assignee: AweXome Ray, Inc., Anyang-si (KR)

(*) Notice: Subject to any disclaimer, the term of this patent is extended or adjusted under 35 U.S.C. 154(b) by 153 days.

(21) Appl. No.: 16/666,834

(22) Filed: Oct. 29, 2019

(65) Prior Publication Data

US 2020/0172400 A1 Jun. 4, 2020

(30) Foreign Application Priority Data

Nov. 30, 2018 (KR) .................. 10-2018-0152222

(51) Int. Cl.
*C01B 32/168* (2017.01)
*C01B 32/162* (2017.01)
*D01F 9/127* (2006.01)

(52) U.S. Cl.
CPC .......... *C01B 32/168* (2017.08); *C01B 32/162* (2017.08); *D01F 9/127* (2013.01)

(58) Field of Classification Search
CPC ..... C01B 32/168; C01B 32/162; C01B 32/16; C01B 32/158; C01B 32/159; C01B 32/164; C01B 32/166; C01B 32/17; C01B 32/172; C01B 32/174; C01B 32/176; C01B 32/178; C01B 2202/00; C01B 2202/02;

(Continued)

(56) References Cited

U.S. PATENT DOCUMENTS 7,550,907 B2 6/2009 Jiang et al.
2003/0002627 A1 1/2003 Espinosa et al.

(Continued)

FOREIGN PATENT DOCUMENTS

CN 101665247 A 3/2010
CN 207330368 U 5/2018

(Continued)

OTHER PUBLICATIONS

Gbordzoe, et al., Effects of lasercurring on the structural and mechanical properties of carbon nanotube assemblages, Materials Science and Engineering B 2017; 223: 143-152 (Year: 2017).*

(Continued)

*Primary Examiner* — Daniel C. McCracken
(74) *Attorney, Agent, or Firm* — Young Basile Hanlon & MacFarlane, P.C.

(57) ABSTRACT

The present invention provides a process for preparing a carbon nanotube sheet, which comprises forming carbon nanotubes; aggregating the carbon nanotubes to form a yarn; treating the yarn with a solvent to enhance the aggregation force; winding the solvent-treated yarn to prepare a sheet preform having a structure in which one yarn is continuously wound; and cutting and/or pressing the sheet preform to prepare a carbon nanotube sheet that comprises an arrangement structure in which one or a plurality of yarns are uniaxially aligned, and a carbon nanotube sheet prepared thereby.

18 Claims, 7 Drawing Sheets

(58) Field of Classification Search
CPC ............ C01B 2202/04; C01B 2202/06; C01B 2202/08; C01B 2202/10; C01B 2202/20; C01B 2202/22; C01B 2202/24; C01B 2202/26; C01B 2202/28; C01B 2202/30; C01B 2202/32; C01B 2202/34; C01B 2202/36; D01F 9/12; D01F 9/127; D01F 9/1271; D01F 9/1272; D01F 9/1273; D01F 9/1274; D01F 9/1275; D01F 9/1276; D01F 9/1277; D01F 9/1278; D01F 9/133
See application file for complete search history.

(56) References Cited

U.S. PATENT DOCUMENTS

| | | | |
|---|---|---|---|
| 2005/0006801 A1* | 1/2005 | Kinloch | C04B 35/62272 264/5 |
| 2007/0003472 A1 | 1/2007 | Tolt | |
| 2008/0170982 A1* | 7/2008 | Zhang | D01F 9/1273 423/447.3 |
| 2009/0208742 A1 | 8/2009 | Zhu et al. | |
| 2010/0260931 A1 | 10/2010 | Malecki et al. | |
| 2013/0309473 A1* | 11/2013 | Sundaram | B82Y 40/00 428/220 |
| 2017/0011880 A1 | 1/2017 | Hu | |
| 2017/0292208 A1 | 10/2017 | Yoon et al. | |
| 2020/0172400 A1* | 6/2020 | Gihm | C01B 32/162 |
| 2020/0243295 A1* | 7/2020 | Gihm | H01J 35/065 |

FOREIGN PATENT DOCUMENTS

| | | | | |
|---|---|---|---|---|
| EP | 3279375 | A1 | 2/2018 | |
| EP | 3315644 | A1 | 5/2018 | |
| JP | H05347142 | A | 12/1993 | |
| JP | 2002293629 | A | 10/2002 | |
| JP | 2007-128892 | * | 5/2007 | .............. H01J 1/304 |
| JP | 2007536434 | A | 12/2007 | |
| JP | 2008214785 | A | 9/2008 | |
| JP | 2011148689 | A | 8/2011 | |
| JP | 2012010583 | A | 1/2012 | |
| JP | 2014503448 | A | 2/2014 | |
| JP | 2014075336 | A | 4/2014 | |
| JP | 2015149299 | A | 8/2015 | |
| JP | 2016046145 | A | 4/2016 | |
| JP | 2022508630 | A | 1/2022 | |
| KR | 20070041024 | A | 4/2007 | |
| KR | 10-2012-0090383 | * | 8/2012 | .............. D01F 9/12 |
| KR | 101284226 | B1 | 7/2013 | |
| KR | 1020140147004 | | 12/2014 | |
| KR | 20160102743 | A | 8/2016 | |
| KR | 20160118637 | A | 10/2016 | |
| KR | 101718784 | | 3/2017 | |
| KR | 1020170041365 | | 4/2017 | |
| KR | 20170121266 | | 11/2017 | |
| KR | 1020180044114 | | 5/2018 | |
| KR | 101876076 | B1 | 7/2018 | |
| KR | 20180104642 | A | 9/2018 | |
| KR | 101962215 | B1 | 3/2019 | |
| KR | 101956153 | B1 | 6/2019 | |
| TW | 201441445 | A | 11/2014 | |
| TW | 201726988 | A | 8/2017 | |
| WO | 2012108607 | A1 | 8/2012 | |
| WO | 2016158575 | A1 | 10/2016 | |
| WO | 2016208342 | A1 | 12/2016 | |
| WO | 2017135234 | A1 | 8/2017 | |

OTHER PUBLICATIONS

Translation of KR 10-2012-0090383 (Year: 2012).*
Ruoff, et al., Mechanical properties of carbon nanotubes: theoretical predictions and experimental measurments, C. R. Physique 2003; 4: 993-1008 (Year: 2006).*
Zhong, et al., Continuous Multilayered Carbon Nanotube Yarns, Adv. Mater. 2010; 22: 692-696 with Supplementary Information (Year: 2010).*
Definition of "interval," accessed online at https://www.merriam-webster.com/dictionary/interval on Feb. 4, 2022 (Year: 2022).*
Definition of contiguous, accessed online at https://www.merriam-webster.com/dictionary/contiguously on Feb. 4, 2022 (Year: 2022).*
Definition of "transverse," accessed online at https://www.merriam-webster.com/dictionary/transverse on Feb. 7, 2022 (Year: 2022).*
International Search Report received for PCT Patent Application No. PCT/KR2019/014068 dated Feb. 5, 2020, 3 pages.
TW Search Report from related case TW108124144 dated May 11, 2020.
TW Office Action from related case TW108124144 dated May 11, 2020.
Potentially related U.S. Appl. No. 16/572,902, filed Sep. 17, 2019.
Taiwan Office Action in co-pending matter TW10920164350 dated Feb. 25, 2020 (eight pages including English translation).
Taiwan Search Report for co-pending matter TW108124101 dated Feb. 17, 2020 (2 pages, including English translation).
Office Action for KR10-2018-0152222 dated Jan. 10, 2019.
Office Action for KR 1020190009430 dated Feb. 25, 2019.
Office Action for KR10-2018-0152222 dated Mar. 10, 2019.
Office Action for KR 1020190009430 dated Apr. 25, 2019.
Office Action for KR1020190039773 dated Jul. 1, 2019.
Office Action for KR1020190039773 dated Oct. 17, 2019.
Potentially related U.S. Appl. No. 16/666,844, filed Oct. 29, 2019.
Potentially related U.S. Appl. No. 16/666,852, filed Oct. 29, 2019.
Extended European Search Report issued in co-pending European Application No. 19888469.4-1108 dated Aug. 2, 2022 (7 pages).
Liu, Wei et al., "Producing superior composites by winding carbon nanotubes onto a mandrel under a poly(vinyl alcohol) spray." Carbon, Elsevier Oxford, GB, vol. 49, No. 14, Jun. 24, 2011 (6 pages).
Office Action in co-pending Japanese Patent Application No. 2021-530884 dated Jul. 4, 2022 with English translation (6 pages).

* cited by examiner

PROCESS FOR PREPARING A CARBON NANOTUBE SHEET COMPRISING A UNIAXIALLY ALIGNED YARN AND CARBON NANOTUBE SHEET PREPARED THEREBY

CROSS-REFERENCE TO RELATED APPLICATION

This application is based on and claims priority under 35 U.S.C. § 119(a) to Korean Patent Application No. 10-2018-0152222, which was filed on Nov. 30, 2018, in the Korean Intellectual Property Office, the disclosure of which is incorporated herein in its entirety by reference.

TECHNICAL FIELD

The present invention relates to a process for preparing a carbon nanotube sheet comprising a uniaxially aligned yarn and a carbon nanotube sheet prepared thereby.

BACKGROUND ART OF THE INVENTION

Carbon nanotubes (CNTs), a kind of carbon isotopes, are substances with a diameter of several to several tens of nanometers and a length of several hundreds of micrometers to several millimeters. Since their publication in the journal Nature in 1991 by Dr. Iijima, research has been carried out in various fields due to their excellent thermal, electrical, and physical properties and high aspect ratio.

Such inherent properties of carbon nanotubes are attributable to the $sp^2$ bond of carbon. They are stronger than iron, lighter than aluminum, and have an electrical conductivity similar to that of metals. Carbon nanotubes, according to the number of walls of nanotubes, are classified into single-walled carbon nanotubes (SWNTs), double-walled carbon nanotubes (DWNTs), and multi-walled carbon nanotubes (MWNTs). They are also divided into zigzag, armchair, and chiral structures depending on the asymmetry/chirality.

The mechanical strength of carbon nanotubes themselves is excellent. In particular, the tensile strength exceeds 100 GPa. However, synthesized carbon nanotubes are limited in their applications since they are short staple fibers. Accordingly, a method of utilizing carbon nanotubes as a sheet form that comprises a plurality of carbon nanotubes is emerging.

There is known a general method of preparing a carbon nanotube sheet, which comprises preparing a carbon nanotube paste, coating or scattering the paste on to the upper side of a substrate in the presence of a solvent, and drying and/or pressing the same to form a sheet.

However, this preparation process has the following technical problems in terms of the structure of a carbon nanotube sheet and the preparation process thereof.

First, when a carbon nanotube paste is coated or scattered on to the upper side of a substrate, the carbon nanotubes may be randomly arranged in various directions. For example, some of the carbon nanotubes stand upright on the substrate in the direction perpendicular to the substrate surface, while other carbon nanotubes are arranged in oblique directions that are not perpendicular to the substrate surface. As a result, the front ends of the plurality of carbon nanotubes are oriented in different directions.

Thus, a carbon nanotube sheet prepared from such carbon nanotubes is in a form in which the carbon nanotubes are not aligned; specifically, the carbon nanotubes are nondirectionally entangled with one another, or their front ends are oriented in different directions.

In general, when carbon nanotubes are aggregated in a state in which the front ends of carbon nanotubes are oriented in a certain direction and the sides thereof are aligned side by side, the $\pi$-$\pi$ interactions among the carbon nanotubes can be maximized. This may be advantageous in that a carbon nanotube yarn and a carbon nanotube sheet prepared therefrom have excellent strength.

In contrast, in a carbon nanotube sheet in a non-aligned form, the $\pi$-$\pi$ interactions among the carbon nanotubes may be deteriorated. Thus, the strength of the carbon nanotube sheet may not reach a desired level. Therefore, it is difficult that the carbon nanotube sheet prepared by the above method maintains its shape by itself, and it can maintain its shape only when it is supported by a separate support layer such as a substrate or an adhesive layer.

In another aspect, in a carbon nanotube sheet in a non-aligned form, the fine front ends of the carbon nanotubes may protrude from the surface of the carbon nanotube sheet, which may lead to surface defects of the carbon nanotube sheet.

As a non-limiting example, in the case where a carbon nanotube sheet is used as an electron emission material, it is ideal that electrons are emitted from only the front ends of the carbon nanotubes that constitute the carbon nanotube sheet. In a carbon nanotube sheet having the above surface defects, however, electrons are also emitted from the fine front ends protruding from the surface, which reduces the electron emission efficiency.

Meanwhile, the conventional process of preparing a carbon nanotube sheet as described above has a disadvantage from the viewpoint of the preparation process in that it is not possible to operate in a continuous process, whereby the productivity is low, and that a process control by a highly skilled worker is required, which makes it difficult to automate the production line.

Accordingly, there is a demand for a novel process for preparing a carbon nanotube sheet and a carbon nanotube sheet capable of addressing the above technical problems.

DISCLOSURE OF THE INVENTION

Technical Problem to be Solved

An object of the present invention is to provide a process for preparing a carbon nanotube sheet comprising a uniaxially aligned yarn and a carbon nanotube sheet prepared thereby.

According to one aspect of the present invention, a yarn in which carbon nanotubes are aggregated is continuously wound to prepare a sheet preform having a structure in which the sides of the yarn are continuously and contiguously wound, and the sheet preform is cut and/or pressed to prepare a carbon nanotube sheet having an arrangement structure in which one or a plurality of yarns are uniaxially aligned.

This preparation process is based on a well-aligned arrangement structure of a yarn, whereby it can produce a carbon nanotube sheet having an excellent strength inherently attributable to the excellent $\pi$-$\pi$ interactions between the yarns. In particular, a carbon nanotube sheet thus prepared can maintain its shape without a support layer such as a substrate and has the advantage of having a smooth surface.

The preparation process of the present invention can also have advantages from the viewpoint of the process in that it is possible to produce yarns in a continuous process and to implement an automated process.

Accordingly, the present invention has a practical purpose in providing a specific embodiment for its implementation.

Solution to the Problem

Before the present invention is specifically described, the terms and words used in the present specification and claims should not be construed as limited to ordinary or dictionary terms. They must be construed in accordance with the technical idea of the present invention based on the principle that an inventor is allowed to appropriately define the concept of terms in order to explain its own invention in the best way.

Accordingly, it is to be understood that the constitution of the embodiments described in the present specification is merely the most preferred embodiment of the present invention and does not represent all the technical ideas of the present invention; thus, various equivalents and changes for substituting them at the time of filing the present application can be made.

As used herein, a singular expression covers a plural expression unless the context clearly dictates otherwise. In this specification, it is to be understood that the terms "comprise," "provide," "have." and the like indicate the presence of features, numbers, steps, elements, or combinations thereof performed; and that they do not exclude the presence of the possibilities of addition of one or more of other features, numbers, steps, elements, or combinations thereof.

As used herein, the term "introduction" may be described interchangeably with "feed" and "injection," and it may be understood to mean the input or addition of a liquid, a gas, heat, or the like.

As used herein, the term "aggregation" is used interchangeably with "gathering, collection, binding" and refers to a form in which a plurality of carbon nanotubes are attached to one another by the π-π interaction.

As used herein, the term "yarn" refers to any yarn formed by the growth of carbon nanotubes in a fiber form or by gathering, aggregation, and/or fusion of a plurality of carbon nanotubes in a fiber form.

In an embodiment, the present invention provides a process for preparing a carbon nanotube sheet, which comprises forming carbon nanotubes;

aggregating the carbon nanotubes to form a yarn;

treating the yarn with a solvent to enhance the aggregation force;

winding the solvent-treated yarn to prepare a sheet preform having a structure in which one yarn is continuously wound; and cutting and/or pressing the sheet preform to prepare a carbon nanotube sheet that comprises an arrangement structure in which one or a plurality of yarns are uniaxially aligned.

In an embodiment, the present invention provides a carbon nanotube sheet, which comprises a plurality of unit yarns that comprise carbon nanotubes and extend in the transverse direction, and has an arrangement structure in which the arrangement of the unit yarns located side by side is repeated in the longitudinal direction in a state in which the sides of one unit yarn of the plurality of unit yarns are contiguous with the sides of its neighboring unit yarns.

Advantageous Effects of the Invention

The preparation process of the present invention is advantageous in that a sheet preform can be prepared while the procedures from the formation of carbon nanotubes through the preparation of the sheet preform are continuously carried out.

In the preparation process of the present invention, a yarn formed by the aggregation of carbon nanotubes is used to prepare a sheet preform, and the sheet preform is processed to prepare a carbon nanotube sheet. In particular, since the yarn is in the form of a fiber in which carbon nanotubes are well aligned, the preparation process of the present invention is capable of providing a carbon nanotube sheet in which carbon nanotubes are well aligned as compared with the conventional preparation process in which a carbon nanotube paste is used.

The process feature should also be noted that a sheet preform having a structure in which a yarn is continuously wound from an end to the other end and is aligned at uniform intervals is prepared, followed by cutting and/or pressing thereof. When such a sheet preform is processed, the unit yarns derived from the yarn would form a structure of a regular arrangement.

As a result, in the carbon nanotube sheet, which comprises the unit yarns, the carbon nanotubes are well aligned in each unit yarn; further, the unit yarns are regularly aligned by virtue of the arrangement structure.

The carbon nanotube sheet may also satisfy Relationship (1) of the present invention. In such event, a certain binding strength is formed between the unit yarns without a separate support such as a substrate. Thus, the carbon nanotube sheet can maintain its shape well.

DETAILED DESCRIPTION FOR CARRYING OUT THE INVENTION

Hereinafter, the embodiments of the present invention will be described in more detail in the order of "a process for preparing a carbon nanotube sheet" and "a carbon nanotube sheet" according to the present invention.

Process for Preparing a Carbon Nanotube Sheet

The process for preparing a carbon nanotube sheet according to the present invention may comprise:

forming carbon nanotubes;

aggregating the carbon nanotubes to form a yarn;

treating the yarn with a solvent to enhance the aggregation force;

winding the solvent-treated yarn to prepare a sheet preform having a structure in which one yarn is continuously wound; and cutting and/or pressing the sheet preform to prepare a carbon nanotube sheet that comprises an arrangement structure in which one or a plurality of yarns are uniaxially aligned.

In the preparation process of the present invention, a sheet preform can be prepared while the procedures from the formation of carbon nanotubes through the preparation of the sheet preform are continuously carried out. This will be described in detail with reference to the following non-limiting examples.

In one specific example, the step of forming carbon nanotubes may comprise:

introducing a raw material that comprises a carbon source and a catalyst into a reaction chamber having a heating means; and converting the carbon source into a plurality of carbon nanotubes in a heating part of the reaction chamber with thermal energy supplied by the heating means.

The step of converting into carbon nanotubes may be followed by aggregating the carbon nanotubes to form a yarn. The step of forming a yarn may comprise aggregating the growing carbon nanotubes by the π-π interaction to form a yarn.

Here, the growing carbon nanotubes may refer to carbon nanotubes that are in the process of growing and/or that have substantially completed their growth.

Figure 1:
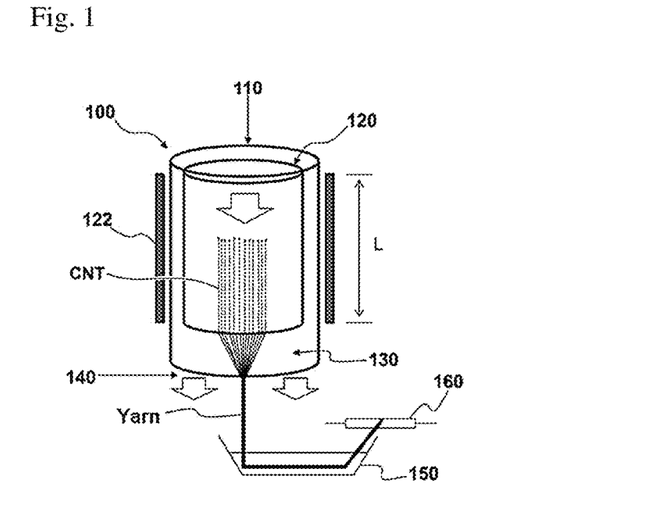
FIG. 1 is a schematic diagram showing a reaction chamber according to an example of the present invention and a process of preparing a yarn thereby.

In this regard, FIG. 1 shows a reaction chamber according to one embodiment of the present invention. Referring thereto, the process for preparing a yarn will be described.

The reaction chamber (100) may comprise an inlet (110) formed at the top of the reaction chamber (100) to introduce a raw material;

a heating part (120) extending downward from the inlet (110) and provided with a heating means (122) on the inner and/or outer side thereof, in which a predetermined temperature, specifically 500° C. or higher, is made such that a carbon source is converted into a plurality of carbon nanotubes;

an aggregation part (130) extending downward from the heating part (120), in which the plurality of carbon nanotubes are aggregated to form a yarn by the π-π interaction; and an outlet (140) extending downward from the aggregation part (130) and discharging the yarn in which the carbon nanotubes are aggregated.

The carbon source may be a liquid or gaseous carbon compound. As a non-limiting example, it may be at least one selected from the group consisting of methanol, ethanol, isopropyl alcohol, butanol, pentanol, cetyl alcohol, ethylene glycol, propylene glycol, glycerol, erythritol, xylitol, sorbitol, bolemitol, allyl alcohol, geraniol, propargyl alcohol, inositol, menthol, methane, hexane, ethylene, acetylene, methyl acetylene, and vinyl acetylene. The carbon source may specifically be acetylene and/or methane.

The catalyst may be a substance that is not included in the catalyst cycle, but changes to an active secondary catalyst (or produces an active catalyst) in the catalytic reaction system. After the catalyst forms a secondary catalyst, carbon nanotubes can be synthesized. The catalyst may comprise at least one metallocene. The metallocene may be, for example, a compound of iron, nickel, cobalt, platinum, ruthenium, molybdenum, or vanadium, or an oxide thereof. In one example of the catalyst, the metallocene may be ferrocene. The content of the catalyst may be, for example, 0.01 part by weight to 0.2 part by weight based on 100 parts by weight of the carbon source.

The raw material may further comprise 0.01 part by weight to 5 parts by weight of a catalytist activator per 100 parts by weight of the carbon source.

Typically, the conversion to carbon nanotubes proceeds while the catalyst is melted, the carbon source is diffused into the catalyst, and then the catalyst is precipitated. The catalyst activator acts as a promoter at the time of the conversion into carbon nanotubes to increase the carbon diffusion rate, so that carbon nanotubes can be synthesized within a short time.

As the catalyst activator, for example, thiophene ($C_4H_4S$) may be used. Thiophene reduces the melting point of the catalyst and removes the foreign amorphous carbon, thereby enabling the synthesis of high purity carbon nanotubes at a relatively low temperature. The content of the catalyst activator may also affect the structure of carbon nanotubes. For example, if 1 to 10 parts by weight, particularly 1 to 5 parts by weight, of thiophene is employed per 100 parts by weight of acetylene as a carbon compound, a multi-walled carbon nanotube fiber may be obtained. If thiophene is employed in an amount of 0.5 part by weight or less with respect to acetylene, a single-walled carbon nanotube fiber may be obtained. The catalyst and the catalyst activator may be liquid in a liquid carbon source and may be gas in a gas phase carbon source.

The raw material may further comprise a carrier gas, which helps the flow of the carbon source and the catalyst into or inside the reaction chamber (100). The carrier gas may flow from the inlet (110) toward the outlet (140) of the reaction chamber (100).

The carrier gas flows from the inlet (110) toward the outlet (140) of the reaction chamber (100), helping smooth the flow of the carbon source and the catalyst into or inside the reaction chamber (100). It may help discharge various impurities remaining in the reaction chamber (100) from the inside of the reaction chamber to the outside. In order to achieve this advantage, the carrier gas may be introduced at a feed rate of 1 mg/sec to 200 mg sec. If it falls outside the above range, it is not advantageous in that the flow of the carbon source and the catalyst may be too slow or too fast, thereby adversely affecting the growth of carbon nanotubes and that the concentration of impurities contained in the yarn may be increased.

The carrier gas may comprise an inert gas and/or a reducing gas. The inert gas may be, for example, argon gas (Ar), nitrogen gas ($N_2$), or a mixture thereof; and the reducing gas may be, for example, hydrogen gas ($H_2$), ammonia gas ($NH_3$), or a mixture thereof.

In one specific example, the carrier gas comprises hydrogen gas and at least one of nitrogen gas and argon gas.

The hydrogen gas may be contained in an amount of greater than 0% by volume up to 90% by volume, more preferably from 1% by volume to 10% by volume, based on the total volume of the carrier gas.

In order for the carbon source to be carbonized, it must undergo a reduction process. The hydrogen gas may be used to carbonize the carbon source through a reduction reaction and remove materials other than carbon to improve the yield and production rate of carbon nanotubes.

However, if the amount of hydrogen gas in the carrier gas exceeds the above range, the carbon in the carbon source may be reduced by hydrogen, resulting in a poor yield of carbon nanotubes. In addition, the excess hydrogen gas hinders the hydrogen atoms in the carbon source from being reduced to hydrogen molecules, thereby inhibiting the conversion of the carbon source to carbon nanotubes.

In another aspect, the impurities reacted with the hydrogen gas and thus reduced generally flow together with the carrier gas and are removed from the reaction chamber. However, if the amount of hydrogen gas is less than the above range, the reaction for reducing other substances than carbon may be insufficient. Thus, the occurrence of other side reactions and the increase in the concentration of impurities would hinder the graphitization and/or carbonization from proceeding smoothly, thereby deteriorating the quality of carbon nanotubes.

The inlet (110) formed in the reaction chamber (100) may be provided with an injection nozzle for injecting a carbon source and a catalyst and a dispersing plate for injecting a carrier gas and a catalyst activator, if necessary. In addition, the inlet (110) may be further provided with a raw material supply unit for supplying a raw material to the reaction chamber (100) and a gas tank for supplying a carrier gas or the like, if necessary.

The carrier gas fed from the inlet (110) may be supplied to the reaction chamber (100) at a linear velocity so as to form a laminar flow in the heating part (120), for which a dispersing plate may be used. The carrier gas may be fed into the reaction chamber (100) through the inlet (110) from a carrier gas supply unit having a gas tank and a flow control means.

The heating part (120) is provided with a heating means (122). When a raw material is introduced into the heating part (120) through the inlet (110), a catalyst contained therein flows toward the outlet (140) in the heating part (120), and the inside of the heating part (120) is heated to high temperatures by the heating means (122). At this time, a carbon source can be converted into carbon nanotubes by a reduction reaction on the catalyst by the thermal energy.

In addition, since the raw material is continuously supplied to the heating part (120), the converted carbon nanotubes can grow in such a manner that the length of the carbon nanotubes is extended from the site where the growth starts on the catalyst. This growth may be collectively referred to as the fusion of carbon nanotubes with one another or the generation of carbon nanotubes at the ends thereof.

The growth of carbon nanotubes is not particularly limited in the direction in which the length of the carbon nanotubes is extended, but they may grow along the direction in which the raw material flows. In one example, the flow direction of the raw material may mean a large flow in which the introduced raw material flows in the heating part (120) to the outlet (140). In another example, the flow direction of the raw material may mean a small flow formed in other random directions than the large flow in the heating part (120) to the outlet (140) as the raw material contacts and passes through the catalyst and the carbon nanotubes in the heating part (120). That is, the direction in which the carbon nanotubes grow may vary depending on the directions of the large flow and the small flow, and it may be determined substantially randomly.

The carbon nanotubes thus grown may move under the influence of the carrier gas and/or gravity and may be positioned contiguous to other carbon nanotubes. The carbon nanotubes contiguous to each other may be aggregated and arranged side by side by the π-π interaction to form a yarn.

Meanwhile, the operating temperature of the heating means (122), the feed rate of the raw material, and the like may be controlled to a desired level during the operation of the heating part (120). The degree of alignment of carbon nanotubes, the diameter and density of a yarn, and the like can be achieved as desired by such control.

As an example on the above, the operating temperature of the heating means (122) may range from 500° C. to 1,500° C., and the feed rate of the raw material may range from $5.5*10^{-4}$ g/sec to $1.0*10^{-3}$ g/sec.

If the operating temperature of the heating means (122) is lower than the above range, the conversion to carbon nanotubes proceeds slowly, which may lead to a deterioration in the crystallinity and strength of the carbon nanotubes. If the operating temperature of the heating means (122) exceeds the above range, branched carbon nanotubes that grow in the form spun in random directions on any carbon nanotubes and have a relatively small diameter may be excessively formed, resulting in a reduction in the density of a yarn subsequently obtained. The growing carbon nanotubes may be aggregated into a yarn in the aggregation part (130) in which a lower temperature than that of the heating part (120) is made.

As described above, the aggregation is mainly carried out by the π-π interactions among the carbon nanotubes placed contiguous to each other side by side. In some cases, an aggregating nozzle having an inner diameter that narrows downward may be provided in the aggregation part (130) to facilitate the aggregation of carbon nanotubes by inducing the gathering thereof.

The yarn may be discharged from the reaction chamber (100) through the outlet (140) located at the bottom of the aggregation part (130) and subsequently form a sheet preform (200 in FIG. 2) of the present invention.

Figure 2:
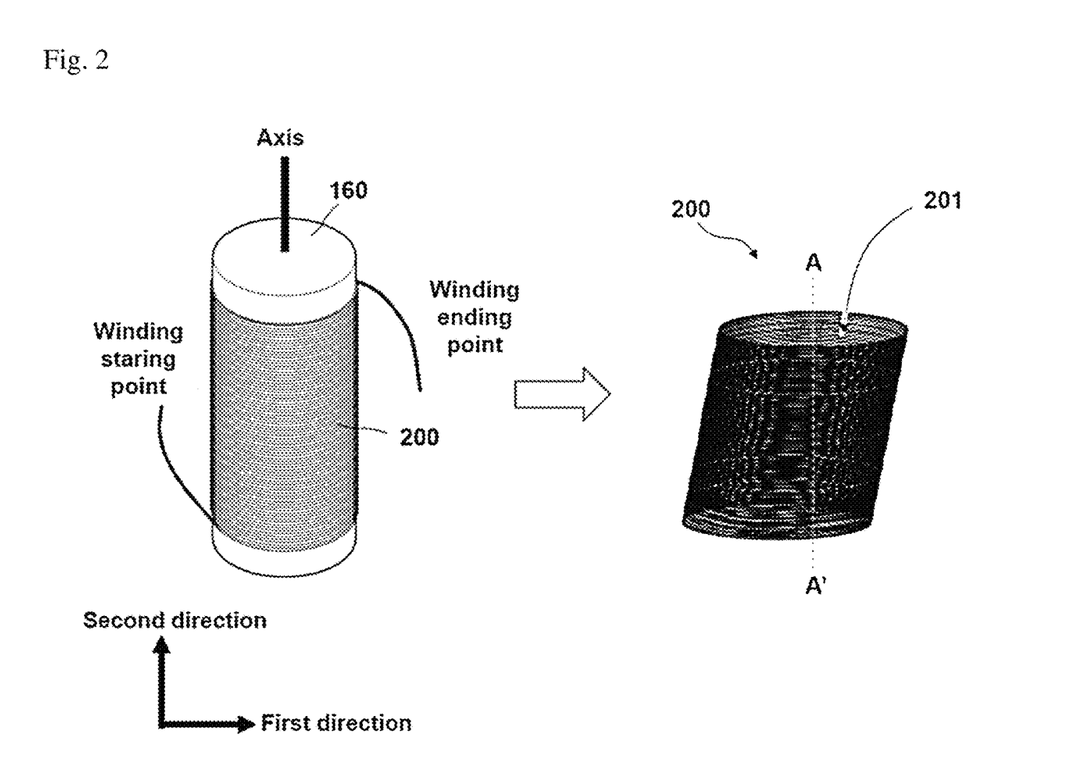
FIG. 2 shows schematic diagrams of a sheet preform prepared according to an example of the present invention.

The yarn thus obtained may be treated with a solvent, followed by the winding thereof to prepare a sheet preform (200).

In such event, the yarn may be wound at uniform intervals along the outer side of a winding means (160). When the yarn discharged from the outlet moves for the winding thereof by the winding means (160), a bath (150) containing a solvent may be installed in the movement path such that the contact of the yarn with the solvent and the discharge therefrom may be automatically carried out. The winding means (160) is not particularly limited as long as it can wind a yarn. Non-limiting examples thereof include a bobbin, a drum, a cylindrical roller, a spindle, a reel, and a conveyor. A bobbin among these may be preferably used as the winding means.

In some cases, the volatilization of the solvent may be induced using an IR lamp, a wind-driven dryer, or the like in order to accelerate the volatilization of the solvent before the yarn is wound.

Although the solvent is not particularly limited, it may be an organic solvent that can increase the π-π interactions among carbon nanotubes constituting a yarn and can be easily volatilized. As a non-limiting example, the solvent may be at least one selected from the group consisting of ethane, ethylene, ethanol, methane, methanol, propane, propene, propanol, acetone, xylene, carbon monoxide, chloroform, acetylene, ethyl acetic acid, diethyl ether, polyethylene glycol, ethyl formate, mesitylene(1,3,5-trimethylbenzene), tetrahydrofuran, dimethylformamide, carbon tetrachloride, naphthalene, anthracene, dichloromethane, ketone, ether, hexane, heptane, octane, pentane, pentene, hexene, benzene, carbon tetrachloride, and toluene.

In one specific example, the step of preparing a sheet preform (200) may comprise winding a yarn using a winding means (160) that is rotating about an axis, and releasing the wound yarn from the winding means (160) to obtain the sheet preform (200).

Figure 3:
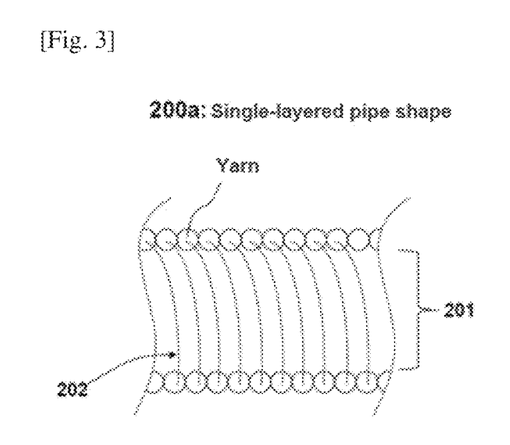
FIG. 3 is a cross-sectional view of the sheet preform vertically cut along the imaginary line A-A' in FIG. 2.

In this regard, FIG. 2 shows schematic diagrams of a yarn wound on a winding means (160) and a sheet preform (200) released from the winding means. FIG. 3 shows a cross-sectional view of the sheet preform (200) vertically cut along the imaginary line A-A' in FIG. 2.

Referring to these drawings, the sheet preform (200) may be in the form of a pipe with the sides of the yarn are continuously and contiguously wound in a second direction parallel to the axis and having an internal space (201).

When the yarn is wound, the yarn may be wound in two or more turns (202) along the outer periphery of the winding means (160), and the intervals between the yarns required to wind the respective turns (202) from the winding starting point to the winding ending point may be substantially uniform. In the sheet preform (200) in the form of a pipe, the intervals between the yarns continuously and contiguously wound may be substantially uniform.

When each turn (202) is deemed as a unit for the sheet preform (200), all the turns (202) are continuously aligned in the second direction. As a result, the yarn that forms respective turns (202) has an arrangement structure aligned continuously in the second direction. This arrangement structure may form an arrangement structure of a carbon nanotube sheet to be described later.

The sheet preform (200) may also be self-supportive by itself, which may be attributable to the tightly wound yarn that has the π-π relationship between the neighboring turns.

Figure 4:
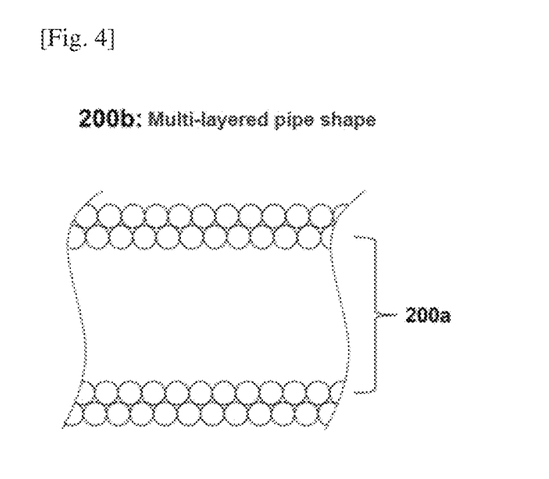
FIG. 4 is a vertical cross-sectional view of a sheet preform according to another example of the present invention.

The sheet preform (200) described above may be a single-layered pipe shape (200a) (FIG. 3) that has one of the structure in which the sides of the yarn are arranged continuously and contiguously or a multi-layered pipe shape (200b) in which two or more of the structure are superposed. The multi-layered pipe shape (200b) is schematically shown in FIG. 4.

The single-layered pipe shape (200a) may be obtained by winding the yarn (200a) one time around the winding means (160) such that the sides of the yarn are arranged continuously and contiguously in the second direction.

The multi-layered pipe shape (200b) may be obtained by further winding the yarn one or more times again around the single-layered pipe shape (200a) already formed such that the sides of the yarn are arranged continuously and contiguously in the second direction.

The sheet preform (200) thus prepared is cut and/or pressed to prepare a plate-shaped carbon nanotube sheet.

For example, when the sheet preform (200) of FIG. 2 is cut along the imaginary axis A-A', one yarn constituting the sheet preform (200) is divided to form a plurality of yarns. In addition, the arrangement structure of the yarn aligned in the sheet preform (200) may be maintained in the carbon nanotube sheet as well.

Figure 5:
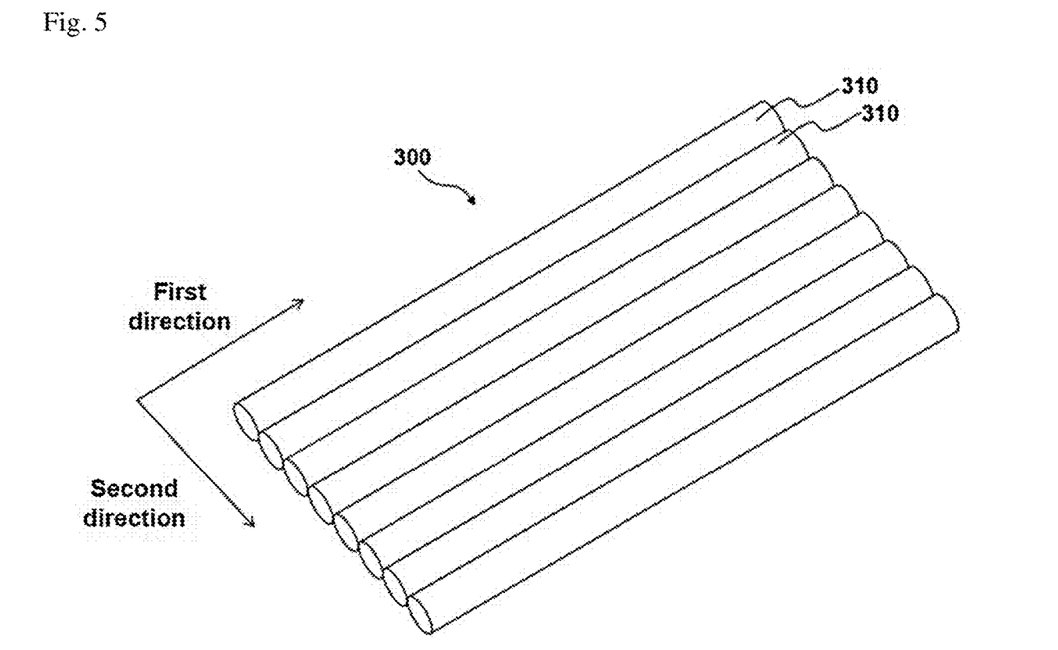
FIG. 5 is a schematic diagram of a carbon nanotube sheet according to an example of the present invention.

In this regard, a carbon nanotube sheet obtained by cutting is schematically shown in FIG. 5.

Referring to FIGS. 2, 3, and 5, at least a part of the sheet preform (200) is cut along the second direction (A-A' in FIG. 2) so that no pipe-shaped yarn exists, whereby a carbon nanotube sheet (300) may be prepared.

Figure 11:
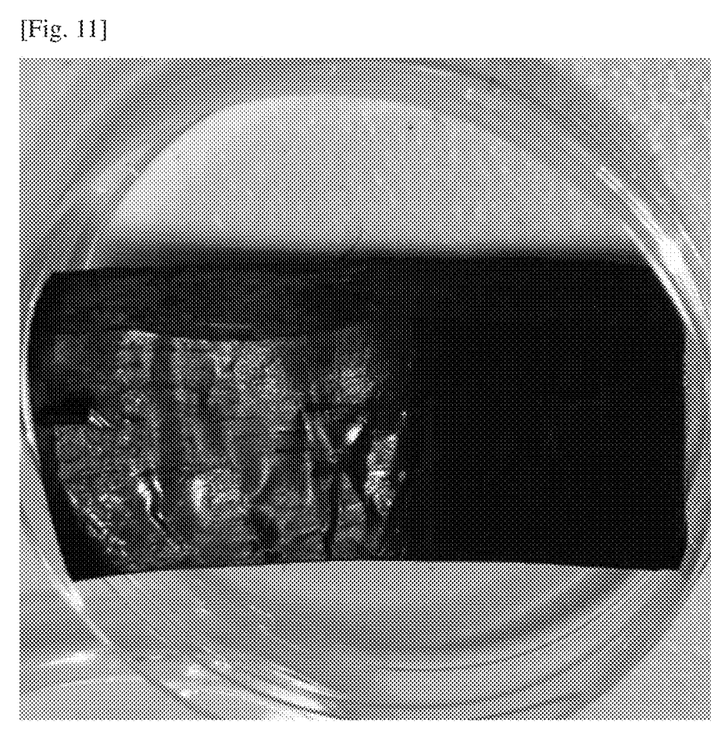
FIG. 11 is a photograph of a carbon nanotube sheet prepared according to the preparation process of the present invention.

The carbon nanotube sheet (300) thus prepared is derived from the cutting of the sheet preform (200) and may comprise a plurality of unit yarns (310) extending between the opposite ends thereof in a first direction perpendicular to the second direction. In addition, the carbon nanotube sheet (300) may have an arrangement structure in which the arrangement of the plurality of unit yarns (310) located side by side is repeated in the second direction in a state in which the sides of one unit yarn of the plurality of unit yarns (310) are contiguous with the sides of its neighboring unit yarns. For reference, a photograph of a carbon nanotube sheet prepared as described above is shown in FIG. 11. Referring to FIG. 11, it is noted that the carbon nanotube sheet of the present invention has a very smooth surface.

Meanwhile, the pressing is a method in which a part of the sheet preform (200) is folded such that the pipe shape is deformed to be flat, thereby forming a carbon nanotube sheet (400). The pressing may be performed by placing the sheet preform (200) between two plate members and then pressing the two plate members toward the sheet preform (200) or by passing a sheet preform (200) between two adjacent rollers to roll it, but it is not limited thereto.

Figure 6:
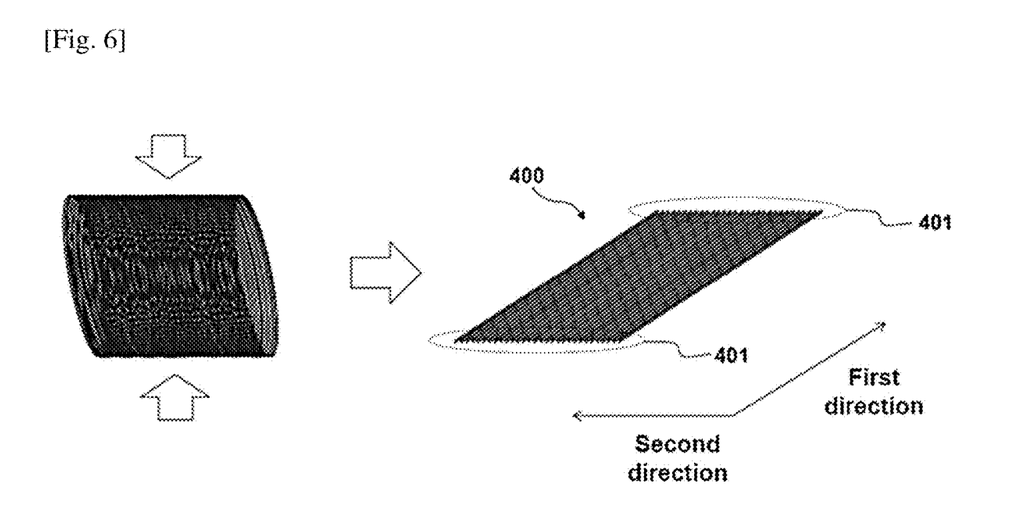
FIG. 6 is a schematic diagram of a carbon nanotube sheet according to another example of the present invention.

In this regard, a carbon nanotube sheet obtained by pressing is schematically shown in FIG. 6.

Referring to FIGS. 2, 3, and 6, the folding positions may form two sides (401) parallel to each other on the outer periphery of the sheet when the carbon nanotube sheet is viewed from the top.

The yarn in an integrated state at an angle of substantially 180 degrees without being cut at the folding positions may form the carbon nanotube sheet. In one example on the above, a sheet preform (200) may be pressed such that the inner sides of the sheet preform (200) opposite to each other with an internal space (201) interposed between them are superposed to prepare a carbon nanotube sheet (400).

The carbon nanotube sheet (400) may comprise a plurality of unit yarns extending between the opposite ends thereof in the first direction without being cut by the pressing when viewed from the top.

In addition, the carbon nanotube sheet (400) may have an arrangement structure in which the arrangement of the plurality of unit yarns located side by side is repeated in the second direction in a state in which the sides of one unit yarn of the plurality of unit yarns are contiguous with the sides of its neighboring unit yarns. The unit yarns and the arrangement structure may be the same as those in FIG. 5. For reference, a photograph of a carbon nanotube sheet prepared as described above is shown in FIG. 13.

In some cases, once at least a part of the sheet preform (200) has been cut, the other portion of the sheet preform (200) having the longest distance from the cutting position is folded at an angle of substantially 180 degrees, thereby preparing a carbon nanotube sheet.

Figure 7:
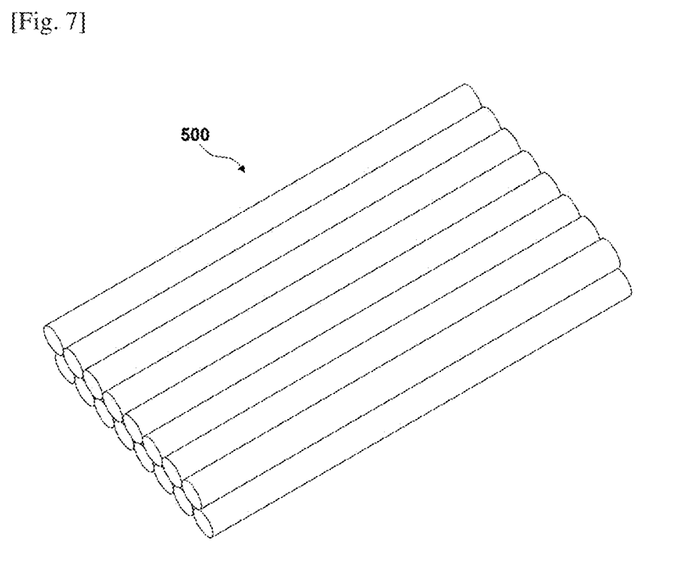
FIG. 7 is a schematic diagram of a carbon nanotube sheet according to still another example of the present invention.

The carbon nanotube sheet prepared as described above may have a first configuration (300 in FIG. 5) or a second configuration (500 in FIG. 7). The first configuration has one of the arrangement structure in which the arrangement of the plurality of unit yarns (310) located side by side is repeated in the second direction in a state in which the sides of one unit yarn of the plurality of unit yarns are contiguous with the sides of its neighboring unit yarns. In the second configuration, two or more of the arrangement structure are superposed.

In one aspect of the present invention, the first configuration (300) may be obtained by cutting a sheet preform (200) in a single-layered pipe shape (200a) prepared by winding a yarn one time around the winding means (160)

such that the sides of the yarn are arranged continuously and contiguously in the second direction.

In another aspect of the present invention, when a sheet preform (200) in a single-layered pipe shape (200a) or a multi-layered pipe shape (200b) is pressed, the unit yarns of the upper part in an arrangement structure may be inserted between the unit yarns of the lower part in an arrangement structure, and the two arrangement structures are pressed and combined to form a first configuration (300) having a single arrangement structure.

In one aspect of the present invention, the second configuration (500) may be obtained by pressing a sheet form (200) in a single-layered pipe shape (200a) or a multi-layered pipe shape (200b).

In another aspect of the present invention, the second configuration (500) may be obtained by cutting a sheet form (200) in a multi-layered pipe shape (200b) to form a first configuration, followed by pressing the first configuration to be folded.

The carbon nanotube sheet thus prepared may be self-supportive by itself like the sheet preform as described above; thus, it can maintain its shape without a separate support such as a substrate.

This is because the yarn regularly aligned in a sheet preform forms the arrangement structure according to the present invention, that is, the arrangement structure in which the arrangement of the plurality of unit yarns located side by side is repeated in the second direction. This may also be attributable to the fact that the carbon nanotube sheet having the arrangement structure is excellent in the π-π interactions between the unit yarns.

However, that a yarn has a regular arrangement structure does not secure that a carbon nanotube sheet is self-supportive and can maintain its shape without a separate support. Accordingly, it is noted by the present inventors that a sheet preform and a carbon nanotube sheet of the present invention can be obtained when certain conditions are satisfied.

In one example on the above, the sides of the respective yarn and unit yarns in the sheet preform and the carbon nanotube sheet are bound by the π-π interactions, and when the sheet preform (200) satisfies the following Relationship (1), the binding strength by the π-π interaction is 0.05 N/tex to 3.0 N/tex, specifically 0.7 N/tex to 2.1 N/tex, more specifically 1.8 N/tex to 2.1 N/tex, whereby the sheet preform (200) and the carbon nanotube sheet can maintain their shapes:

$$10 < D*T*C < 7*10^4 \quad (1)$$

In the above,

D represents the diameter of the yarn in the sheet preform (200), which is selected from the range of 10 μm to 700 μm, T represents the interval between the yarns contiguously wound in the sheet preform (200), which is selected from the range of 0.0001 μm to 0.005 μm, and C represents the number of carbon nanotubes per unit area (μm$^2$) of the yarn in the sheet preform (200), which ranges from 10$^4$ to 10.

The diameter (D) of the yarn may be proportional to the π-π interaction. The interval (T) between the yarns may be inversely proportional to the π-π interaction. The number of carbon nanotubes (C) may be proportional to the π-π interaction.

Thus, it may be designed that the interval (T) between the yarns is narrowed and the other factors are increased. But if the value according to Relationship (1) exceeds the range, there is a possibility that the sheet preform is distorted and the arrangement structure of the yarn intended in the present invention is not obtained. On the other hand, if the value according to Relationship (1) is less than the range, the binding strength is insufficient and both the sheet preform and the carbon nanotube sheet can hardly maintain their shapes.

Meanwhile, in one specific example, the preparation process of the present invention may further comprise at least one step of processing a carbon nanotube sheet selected from cutting, adhesion, lamination, and folding.

The cutting may be a step in which at least one of the outer peripheries and the edges that constitute the planar shape of the carbon nanotube sheet is cut to modify the planar shape to a polygonal shape or a composite shape that has any one rounded outer periphery or edge.

Figure 8:
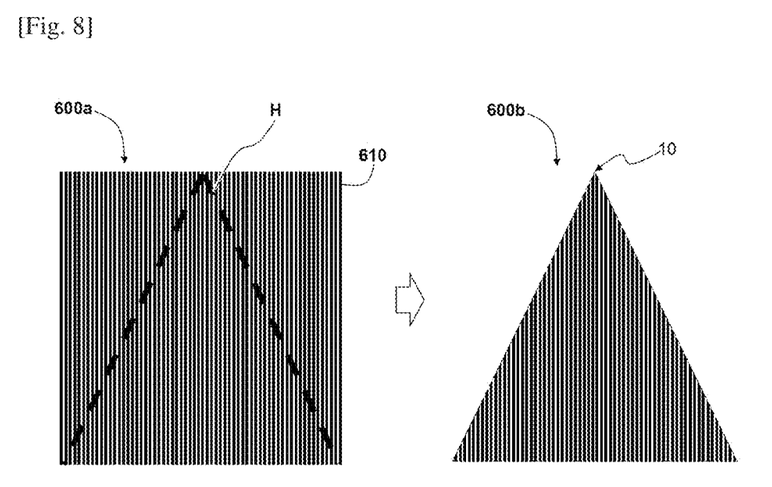
FIG. 8 is a schematic plan view of a carbon nanotube sheet processed by cutting.
Figure 12:
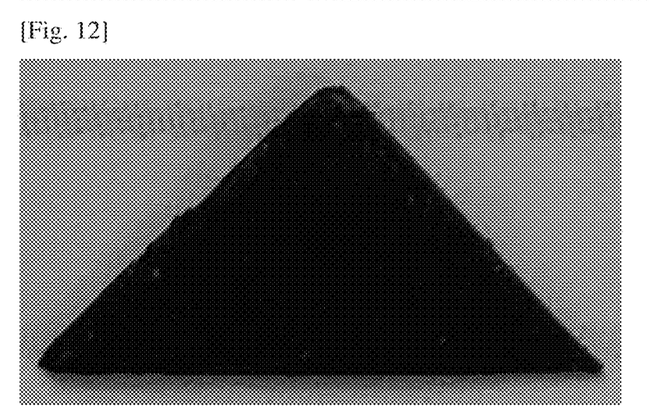
FIG. 12 is a photograph of a carbon nanotube sheet processed by cutting.

A schematic diagram related to the cutting is shown in FIG. 8. In addition, FIG. 12 shows a photograph of a carbon nanotube sheet processed by cutting. Referring to FIGS. 8 and 12, two edges of the carbon nanotube sheet (600a) in a planar shape of a rectangle are cut along a cutting line (H) to a carbon nanotube sheet (600b) in a planar shape of a triangle having three internal angles.

Here, the cutting of the carbon nanotube sheet is performed such that any one of the ends of the unit yarns (610) extending in the first direction forms at least one of the edges of the polygon or extends from the edge.

In one example, the cutting may be performed in a direction parallel or oblique to the vertical cross-section of the carbon nanotubes. In the cutting in an oblique direction, the cutting angle may be 10 degrees to 70 degrees.

In one example, the polygon may be a triangle, a wedge shape in which at least a part of a pair of triangles are superposed, or a polygon having at least four internal angles in the planar shape of the carbon nanotube sheet.

In one example, the composite shape may be, for example, a triangular shape in which at least one outer periphery extending from any one apex is rounded.

The adhesion may be a step of impregnating the carbon nanotube sheet with a solvent capable of interacting with the carbon nanotubes and drying it so as to enhance the π-π interactions between the unit yarns that constitute the carbon nanotube sheet.

The interactable solvent may be an at least one organic solvent selected from the group consisting of ethane, ethylene, ethanol, methane, methanol, propane, propene, propanol, acetone, xylene, carbon monoxide, chloroform, acetylene, ethyl acetic acid, diethyl ether, polyethylene glycol, ethyl formate, mesitylene(1,3,5-trimethylbenzene), tetrahydrofuran, dimethylformamide, carbon tetrachloride, naphthalene, anthracene, dichloromethane, ketone, ether, hexane, heptane, octane, pentane, pentene, hexene, benzene, carbon tetrachloride, and toluene.

The lamination may be a step of laminating two or more carbon nanotube sheets upward with respect to the ground. In such event, two or more carbon nanotube sheets having the same or different planar shapes may be laminated.

In some cases, an adhesive may be added to the contact interface between the carbon nanotube sheets, and lamination by heat may be further performed.

The folding may be a step of winding the carbon nanotube sheet in a roll shape or folding the carbon nanotube sheet one or more times so that the outer sides thereof are superposed with each other.

Figure 9:
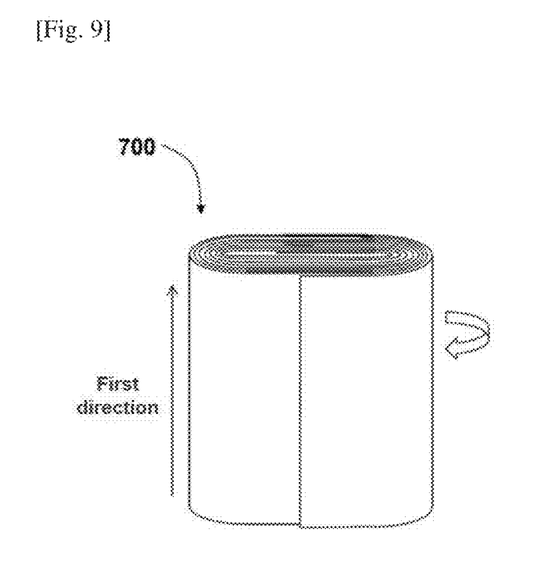
FIG. 9 is a schematic view of a carbon nanotube sheet processed by folding into a roll shape.

In this regard, a carbon nanotube sheet wound into a roll shape is schematically shown in FIG. 9. A carbon nanotube sheet folded is schematically shown in FIG. 10.

Referring to FIG. 9, a carbon nanotube sheet may be wound from one end to the other end thereof into a roll shape (700).

However, it is preferable that the direction in which the carbon nanotube sheet is wound, i.e., a direction perpendicular to the direction from the one end to the other end, corresponds to the first direction in which the unit yarns extend between the opposite ends thereof.

Figure 10:
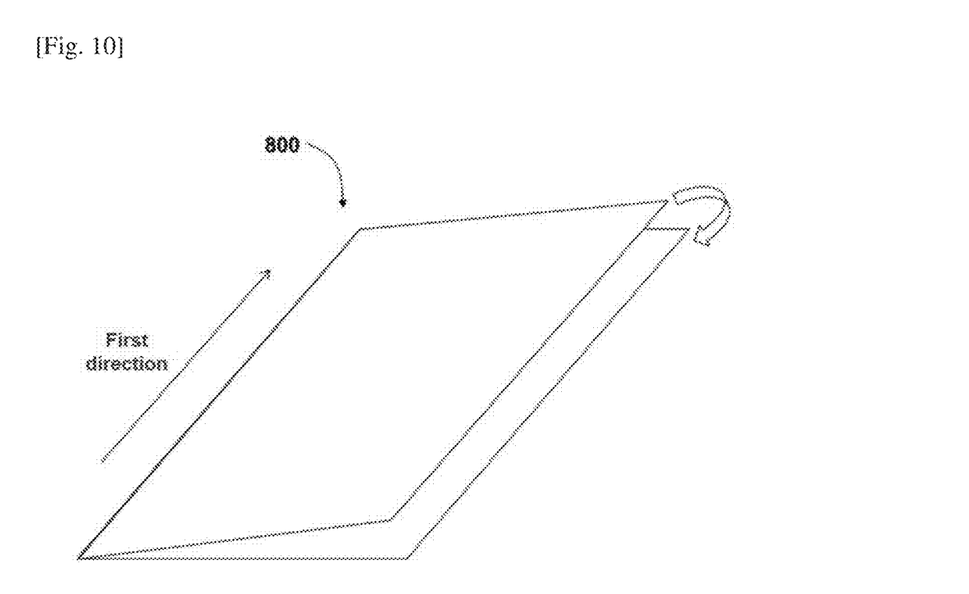
FIG. 10 is a schematic view of a carbon nanotube sheet processed by folding such that its outer sides are superposed.

Referring to FIG. 10, the carbon nanotube sheet may be a form (800) folded in half so that the outer sides of the carbon nanotube sheet are superposed with each other. Here, the carbon nanotube sheet may be folded at any point thereof with the first direction in which the unit yarns extend between the opposite ends thereof as an axis.

Carbon Nanotube Sheet

The carbon nanotube sheet according to the present invention comprises:

a plurality of unit yarns comprising carbon nanotubes and extending in the transverse direction, and has an arrangement structure in which the arrangement of the unit yarns located side by side is repeated in the longitudinal direction in a state in which the sides of one unit yarn of the plurality of unit yarns are contiguous with the sides of its neighboring unit yarns.

In one example, the unit yarn may be an independent member derived from the cutting of a yarn.

In one example, the unit yarn is derived from the folding of a yarn and may be folded at an angle of 180 degrees at the folding position. In such event, in the carbon nanotube sheet, the folded configuration may be alternately repeated in a pair of outer peripheries, and the unit yarns may form the carbon nanotube sheet as an integral part that extends with respect to each other.

In one specific example, the sides of the unit yarns are bound by the π-π interactions, and when the carbon nanotube sheet satisfies the following Relationship (1), the binding strength by the π-π interaction is 0.05 N/tex to 3.0 N/tex, specifically 0.7 N/tex to 2.1 N/tex, more specifically 1.8 N/tex to 2.1 N/tex, whereby the carbon nanotube sheet can maintain its shape:

$$10 < D*T*C < 7*10^4 \qquad (1)$$

In the above,

D represents the diameter of the yarn, which is selected from the range of 10 μm to 700 μm, T represents the interval between the unit yarns contiguously located, which is selected from the range of 0.0001 μm to 0.005 μm, and C represents the number of carbon nanotubes per unit area (μm$^2$) of the unit yarns, which ranges from $10^4$ to $10^7$.

The diameter (D) of the unit yarns may be proportional to the π-π interaction. The interval (T) between the unit yarns may be inversely proportional to the π-π interaction. The number of carbon nanotubes (C) may be proportional to the π-π interaction.

Thus, it may be designed that the interval (T) between the unit yarns is narrowed and the other factors are increased. But if the value according to Relationship (1) exceeds the range, there is a possibility that the carbon nanotube sheet is distorted and the arrangement structure of the yarn intended in the present invention is not obtained. On the other hand, if the value according to Relationship (1) is less than the range, the binding strength is insufficient and the carbon nanotube sheet can hardly maintain its shape.

In one specific example, the carbon nanotube sheet may have a first configuration or a second configuration. The first configuration has one of the arrangement structure. In the second configuration, two or more of the arrangement structure are superposed.

In one specific example, the planar shape of the carbon nanotube sheet viewed from the top may be a polygonal shape whose outer peripheries are composed of straight lines or a composite shape whose outer peripheries comprise straight lines and curves.

Hereinafter, the function and effect of the present invention will be described in more detail through specific examples of the present invention. However, these examples are merely illustrative of the invention and are not intended to limit the scope of the invention.

EXAMPLE

A raw material containing ferrocene, methane, a sulfur-containing catalyst activator, and a carrier gas (hydrogen) was used to synthesize carbon nanotubes in a reaction chamber, which were aggregated to prepare a yarn.

Here, in the preparation of yarn, the preparation process of the yarn was controlled such that the number of carbon nanotubes per unit area (μm$^2$) of the yarn was about $10^4$, and the diameter of the yarn was 150 μm.

Then, the yarn thus prepared was treated with a solvent and wound by a bobbin as a winding means rotated about an axis in the same manner as in FIG. 2.

In such event, the yarn was wound uniformly so that the interval between the contiguous yarns was about 0.004 μm. Upon completion of the winding, the yarn was released from the bobbin to prepare a pipe-shaped sheet preform having an internal space.

Comparative Example

A raw material containing ferrocene, methane, a sulfur-containing catalyst activator, and a carrier gas (hydrogen) was used to synthesize carbon nanotubes in a reaction chamber, which were aggregated to prepare a yarn.

Here, in the preparation of yarn, the preparation process of the yarn was controlled such that the number of carbon nanotubes per unit area (μm$^2$) of the yarn was about $10^4$, and the diameter of the yarn was 8 μm.

Then, the yarn thus prepared was treated with a solvent and wound by a bobbin as a winding means rotated about an axis in the same manner as in FIG. 2.

In such event, the yarn was wound uniformly so that the interval between the contiguous yarns was about 0.0001 μm. Upon completion of the winding, the yarn was released from the bobbin to prepare a pipe-shaped sheet preform having an internal space.

Test Example: Evaluation of the Binding Force of a Sheet Preform

First, the sheet preforms obtained in the Example and the Comparative Example were evaluated for calculating the values according to the following Relationship (1) according to the present invention to see whether the values fall within the scope of the present invention:

$$10 < D*T*C < 7*10^4 \qquad (1)$$

In addition, the binding strength of each sheet preform was measured.

TABLE 1

|  | Diameter of a yarn (D) (unit: μm) | Interval between yarns (T) (unit: μm) | Number of carbon nanotubes (per unit area (μm²) of a yarn) | Value according to Relationship (1) | Binding strength (N/tex) |
|---|---|---|---|---|---|
| Example | 150 | 0.004 | $10^4$ | $6 * 10^3$ | 1.9 |
| Comparative Example | 8 | 0.0001 | $10^4$ | 8 | 0.2 |

As can be seen from the above results, the Example in which the value according to the Relationship (1) of the present invention fell within the scope of the present invention showed relatively high binding strength. In contrast, the Comparative Example in which the value fell outside the above range showed a low binding strength.

Figure 13:
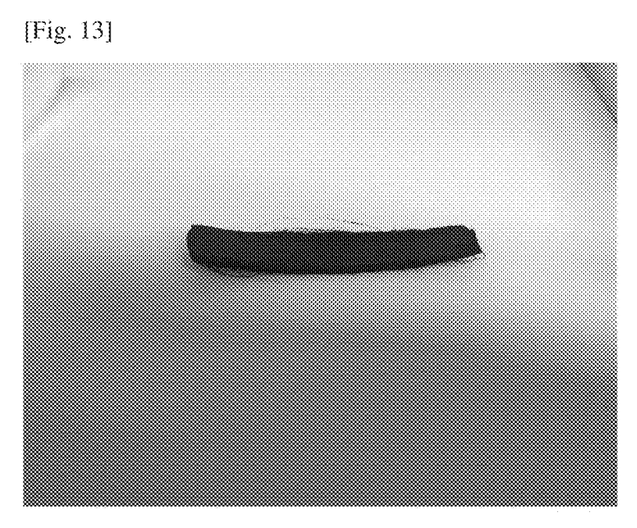
FIG. 13 is a photograph of a processed carbon nanotube sheet processed by pressing.

In one example, a carbon nanotube sheet having the second configuration may be prepared by pressing a sheet preform obtained according to the Example. Since the interval between the unit yarns can be smaller, the carbon nanotube sheet thus prepared can have an improved binding strength. For reference, the carbon nanotube sheet thus prepared is shown in FIG. 13.

Although the present invention has been fully described by way of example, it is to be understood that the invention is intended to cover various modifications and equivalent arrangements included within the spirit and scope of the invention.

The invention claimed is:

1. A process for preparing a carbon nanotube sheet, which comprises:
   forming carbon nanotubes;
   aggregating the carbon nanotubes to form a yarn;
   treating the yarn with a solvent to enhance the aggregation force;
   winding the solvent-treated yarn to prepare a sheet preform having a structure in which one yarn is continuously wound; and
   cutting and/or pressing the sheet preform to prepare a carbon nanotube sheet that comprises an arrangement structure in which one yarn when the sheet preform is pressed or a plurality of yarns when the sheet preform is cut are uniaxially aligned,
   wherein the yarn in the sheet preform; and the one yarn of the carbon nanotube sheet when the sheet preform is pressed; and the plurality of yarns of the carbon nanotube sheet when the sheet preform is cut are connected with the sides thereof aligned side by side, wherein the sides that are contiguous to each other are bound by π-π interactions, and
   wherein when the sheet preform satisfies the following Relationship (1), with D which represents the diameter of the yarn in the sheet preform, T which represents the interval between the yarns in the sheet preform, and C which represents the number of carbon nanotubes per unit area (μm²) of the yarn in the sheet preform, the sheet preform and the carbon nanotube sheet maintain their shapes:

$$10 < D*T*C < 7*10^4 \quad (1).$$

2. The process for preparing a carbon nanotube sheet of claim 1, wherein the step of forming carbon nanotubes comprises introducing a raw material that comprises a carbon source and a catalyst into a reaction chamber having a heating means; and converting the carbon source into a plurality of carbon nanotubes in a heating part of the reaction chamber with thermal energy supplied by the heating means, and
   the step of forming a yarn comprises aggregating the growing carbon nanotubes by the π-π interaction to form a yarn.

3. The process for preparing a carbon nanotube sheet of claim 1, wherein the step of preparing a sheet preform comprises winding the yarn using a winding means that is rotating about an axis, and releasing the wound yarn from the winding means to obtain the sheet preform, and
   the sheet preform is in the form of a pipe with the sides of the yarn are continuously and contiguously wound in a second direction parallel to the axis and having an internal space.

4. The process for preparing a carbon nanotube sheet of claim 3, wherein at least a part of the sheet preform is cut along the second direction so that no pipe-shaped yarn exists, whereby a carbon nanotube sheet is prepared; and
   the carbon nanotube sheet is derived from the cutting of the sheet preform and comprises a plurality of unit yarns extending between the opposite ends thereof in a first direction perpendicular to the second direction, and has an arrangement structure in which the arrangement of the unit yarns located side by side is repeated in the second direction in a state in which the sides of one unit yarn of the plurality of unit yarns are contiguous with the sides of its neighboring unit yarns.

5. The process for preparing a carbon nanotube sheet of claim 3, wherein the sheet preform is pressed such that the inner sides of the sheet preform opposite to each other with the internal space interposed are superposed to prepare a carbon nanotube sheet; and
   the carbon nanotube sheet comprises a plurality of unit yarns extending between the opposite ends thereof in the first direction in the planar shape, and has an arrangement structure in which the arrangement of the unit yarns located side by side is repeated in the second direction in a state in which the sides of one unit yarn of the plurality of unit yarns are contiguous with the sides of its neighboring unit yarns.

6. The process for preparing a carbon nanotube sheet of claim 1, wherein the sheet preform is a single-layered pipe shape that has one structure in which the sides of the yarn are arranged continuously and contiguously or a multi-layered pipe shape in which two or more structures are superposed.

7. The process for preparing a carbon nanotube sheet of claim 1, wherein the carbon nanotube sheet has a first configuration or a second configuration, wherein the first configuration has one arrangement structure, and in the second configuration, two or more arrangement structures are superposed.

8. The process for preparing a carbon nanotube sheet of claim 1,
wherein when the sheet preform satisfies the Relationship (1), the binding strength by the π-π interaction is 0.7 N/tex to 2.1 N/tex,
wherein D selected from the range of 10 μm to 700 μm,
wherein T is selected from the range of 0.0001 μm to 0.005 μm, and
wherein C ranges from $10^4$ to $10^5$.

9. The process for preparing a carbon nanotube sheet of claim 1, which further comprises at least one step of processing a carbon nanotube sheet selected from cutting, adhesion, lamination, and folding.

10. The process for preparing a carbon nanotube sheet of claim 9, wherein the cutting is a step in which at least one of the outer peripheries and the edges that constitute the planar shape of the carbon nanotube sheet is cut to modify the planar shape to a polygonal shape or a composite shape having any one rounded outer periphery or corner.

11. The process for preparing a carbon nanotube sheet of claim 9, wherein the adhesion is a step of impregnating the carbon nanotube sheet with a solvent capable of interacting with the carbon nanotubes and drying it so as to enhance the π-π interactions between the unit yarns that constitute the carbon nanotube sheet.

12. The process for preparing a carbon nanotube sheet of claim 9, wherein the lamination is a step of laminating two or more carbon nanotube sheets in a thickness direction of the sheets.

13. The process for preparing a carbon nanotube sheet of claim 9, wherein the folding is a step of winding the carbon nanotube sheet in a roll shape or folding the carbon nanotube sheet one or more times so that the outer sides thereof are superposed with each other.

14. A carbon nanotube sheet, which comprise a plurality of unit yarns comprising carbon nanotubes and extending in a first direction, and has an arrangement structure in which the arrangement of the plurality of unit yarns located side by side is repeated in a second direction in a state in which the sides of one unit yarn of the plurality of unit yarns are contiguous with the sides of its neighboring unit yarns, wherein the neighboring unit yarns are connected with the sides thereof aligned side by side, wherein the sides that are contiguous to each other are bound by π-π interactions, and
wherein when the carbon nanotube sheet satisfies the following Relationship (1), with D which represents the diameter of the unit yarns, T which represents the distance between sides of the unit yarns, and C which represents the number of carbon nanotubes per unit area ($\mu m^2$) of the unit yarns, the carbon nanotube sheet maintains its shape:

$$10 < D*T*C < 7*10^4 \quad (1).$$

15. The carbon nanotube sheet of claim 14,
wherein when the carbon nanotube sheet satisfies the Relationship (1), the binding strength by the π-π interaction is 0.7 N/tex to 2.1 N/tex,
wherein D is selected from the range of 10 μm to 700 μm,
wherein T is selected from the range of 0.0001 μm to 0.005 μm, and
wherein ranges from $10^4$ to $10^5$.

16. The carbon nanotube sheet of claim 14, which has a first configuration or a second configuration, wherein the first configuration has one arrangement structure, and in the second configuration, two or more arrangement structures are superposed.

17. The carbon nanotube sheet of claim 14, wherein the planar shape of the carbon nanotube sheet viewed from the top is a polygonal shape whose outer peripheries are composed of straight lines or a composite shape whose outer peripheries comprise straight lines and curves.

18. A process for preparing a carbon nanotube sheet, which comprises:
forming carbon nanotubes;
aggregating the carbon nanotubes to form a yarn;
treating the yarn with a solvent to enhance the aggregation force;
winding the solvent-treated yarn to prepare a sheet preform having a structure in which one yarn is continuously wound; and
cutting and/or pressing the sheet preform to prepare a carbon nanotube sheet that comprises an arrangement structure in which one or a plurality of yarns are uniaxially aligned,
wherein the step of preparing a sheet preform comprises winding the yarn using a winding means that is rotating about an axis, and releasing the wound yarn from the winding means to obtain the sheet preform,
wherein the sheet preform is in the form of a pipe with the sides of the yarn are continuously and contiguously wound in a second direction parallel to the axis and having an internal space,
wherein the sheet preform is pressed such that the inner sides of the sheet preform opposite to each other with the internal space interposed are superposed to prepare a carbon nanotube sheet; and
wherein the carbon nanotube sheet comprises a plurality of unit yarns extending between the opposite ends thereof in the first direction in the planar shape and has an arrangement structure in which the arrangement of the unit yarns located side by side is repeated in the second direction in a state in which the sides of one unit yarn of the plurality of unit yarns are contiguous with the sides of its neighboring unit yarns.

* * * * *

UNITED STATES PATENT AND TRADEMARK OFFICE
CERTIFICATE OF CORRECTION

| | |
|---|---|
| PATENT NO. | : 11,453,591 B2 |
| APPLICATION NO. | : 16/666834 |
| DATED | : September 27, 2022 |
| INVENTOR(S) | : Se Hoon Gihm, Keun Soo Jeong and Yeon Su Jung |

It is certified that error appears in the above-identified patent and that said Letters Patent is hereby corrected as shown below:

On the Title Page

Item [56] In Other Publications; Remove "Office Action for KR10-2018-0152222 dated Mar. 10, 2019."

Item [56] In Other Publications; Remove "Office Action for KR 1020199009430 dated Apr. 25, 2019."

In the Claims

Claim 1 Line 15 Column 15 Line 46; Delete "and" after "preform;"

Claim 11 Line 5 Column 17 Line 24; Replace "n-n" with "π-π"

Claim 15 Lines 8 Column 18 Line 8; Add "C" after "wherein"

Signed and Sealed this
Fourth Day of April, 2023

Katherine Kelly Vidal
*Director of the United States Patent and Trademark Office*